(12) United States Patent
Asher et al.

(10) Patent No.: US 7,562,034 B2
(45) Date of Patent: Jul. 14, 2009

(54) ELECTRONIC SILENT AUCTION SYSTEM AND METHOD

(75) Inventors: Joseph M. Asher, New York, NY (US); Howard W. Lutnick, New York, NY (US)

(73) Assignee: BGC Partners, Inc., New York, NY (US)

( * ) Notice: Subject to any disclaimer, the term of this patent is extended or adjusted under 35 U.S.C. 154(b) by 702 days.

(21) Appl. No.: 10/816,238

(22) Filed: Apr. 1, 2004

(65) Prior Publication Data

US 2005/0222914 A1 Oct. 6, 2005

(51) Int. Cl.
G06Q 30/00 (2006.01)
(52) U.S. Cl. .............................. 705/26; 705/27; 705/37
(58) Field of Classification Search ................... 705/26, 705/27, 37
See application file for complete search history.

(56) References Cited

U.S. PATENT DOCUMENTS

| 5,663,547 | A | * | 9/1997 | Ziarno ........................ 235/380 |
| 5,696,366 | A | | 12/1997 | Ziarno ........................ 235/380 |
| 5,803,500 | A | * | 9/1998 | Mossberg ..................... 283/67 |
| 5,835,896 | A | | 11/1998 | Fisher et al. |
| 6,134,548 | A | | 10/2000 | Gottsman et al. |
| 6,243,691 | B1 | | 6/2001 | Fisher et al. |
| 6,266,652 | B1 | | 7/2001 | Godin et al. |
| 6,415,269 | B1 | | 7/2002 | Dinwoodie |
| 6,449,601 | B1 | | 9/2002 | Friedland et al. |
| 6,704,713 | B1 | * | 3/2004 | Brett ........................... 705/37 |
| 2002/0062276 | A1 | | 5/2002 | Krueger et al. ................ 705/37 |
| 2002/0115449 | A1 | | 8/2002 | Allen .......................... 455/456 |
| 2002/0116320 | A1 | | 8/2002 | Nassiri |
| 2002/0128952 | A1 | | 9/2002 | Melkomian et al. |
| 2003/0074330 | A1 | | 4/2003 | Asokan et al. ................. 705/80 |
| 2003/0078793 | A1 | | 4/2003 | Toth |
| 2003/0220867 | A1 | * | 11/2003 | Goodwin et al. .............. 705/37 |
| 2003/0225669 | A1 | * | 12/2003 | Cohen .......................... 705/37 |
| 2006/0287924 | A1 | * | 12/2006 | Admon ........................ 705/26 |
| 2007/0192233 | A1 | | 8/2007 | Salant |

FOREIGN PATENT DOCUMENTS

| EP | 1 041 502 A2 | 10/2000 |
| EP | 1041502 | * 10/2000 |

OTHER PUBLICATIONS

Blue Moon Interactive: Internet Archive Wayback Machine, www.archive.org/.../www.bluemooninteractive.com; Apr. 23, 1999, 5pgs.*

(Continued)

Primary Examiner—Robert M. Pond
(74) Attorney, Agent, or Firm—Ruth J. Ma

(57) ABSTRACT

An electronic silent auctioning system comprising a first local client, a second local client, and a local network device. The network device is operable to receive one or more unique bids on an item from each local client. The item is described in a central repository on the server for processing. The server is operable to determine a winning bid for the item based on predetermined criteria and communicate the received bids to a server.

36 Claims, 2 Drawing Sheets

OTHER PUBLICATIONS

Abelauctions: Internet Archive Wayback Machine, www.archive.org/.../www.ableauctions.com; Jun. 1, 2002, Aug. 2, 2002, 5pgs.*

O'Brien, Dan; "Denver-base newspaper chain to advertise silent, online auction" Knight Ridder Tribune Business News, Mar. 28, 2003, Proquest #31962931, 3pgs.*

Pending U.S. Appl. No. 10/629,128, "Systems and Methods for Automated Internet-Based Auction," inventors Joseph M. Asher et al., 63 pages, filed Jul. 29, 2004.

*Notification of Transmittal of the International Search Report and the Written Opinion of the International Searching Authority* for International Application No. PCT/US05/11198; 7 pages, Oct. 3, 2006.

U.S. Appl. No. 12/208,189, filed Sep. 10, 2008, Asher et al.

eBay, eBay Inc., at http://www.ebay.com (printed Jul. 28, 2003).

Bidz, Bidz, Inc., at http:///web-1.bidz.com (printed Jul. 28, 2003).

Yahoo! Auctions, Yahoo! Inc., at http//auctions.shopping.yahoo.com (printed Jul. 28, 2003).

USPTO Office Action for U.S. Appl. No. 10/629,128, Jun. 13, 2006 (5 pages).

USPTO Office Action for U.S. Appl. No. 10/629,128, Aug. 11, 2006 (13 pages).

USPTO Office Action for U.S. Appl. No. 10/629,128, Feb. 5, 2007 (9 pages).

USPTO Advisory Action for U.S. Appl. No. 10/629,128, May 30, 2007 (3 pages).

USPTO Office Action for U.S. Appl. No. 10/629,128, Jan. 3, 2008 (9 pages).

Notice of Allowance for U.S. Appl. No. 10/629,128; Jul. 31, 2008 (9 pages).

* cited by examiner

ELECTRONIC SILENT AUCTION SYSTEM AND METHOD

TECHNICAL FIELD

This disclosure relates generally to the field of data processing and, more specifically, to an electronic silent auction system and method.

BACKGROUND OF THE INVENTION

Silent auctions, such as those implemented for charity and fund-raising events, typically follow a similar manual format. For example, bidders write their names or identification numbers, as well as their bid amounts, to submit bids for each item being auctioned, thereby publicly displaying the bids. Each bidder may "outbid" another by manually writing his name along with an amount greater than that of the previous high bidder. At the end of the silent auction, all bids may be collected and the winning bidder on each item announced. Such traditional techniques usually require bidders to take an active role in monitoring their own bids with respect to several items and travel from one location to another in order to place additional bids, assuming they remain interested in bidding on the items available for auction. In addition, such methods normally involve substantive paperwork and may be associated with checkout errors.

SUMMARY OF THE INVENTION

This disclosure provides a system and method for providing an electronic silent auction. In one embodiment, the method includes receiving a first bid for an item from a first local client, with the item described in a central repository on a server. A second bid for the item is received from a second local client, with the second bid being greater than the first bid. Each bid is communicated to the server for processing and the server is operable to determine a winning bid for the item based on predetermined criteria.

In another embodiment, an electronic silent auctioning system comprises a first local client, a second local client, and a local network device. The network device is operable to receive one or more unique bids on an item from each local client the item described in a central repository on the server for processing. The server is operable to determine a winning bid for the item based on predetermined criteria and communicate the received bids to a server.

In a further embodiment, software for providing an electronic silent auction is operable to receive a first bid for an item from a first client, through a network device, with the item described in a central repository. A second bid is for the item from a second client through the network device and the second client is co-located with the first client and the network device. The software is further operable to process the received bids to determine a winning bid for the item based at least partially on predetermined criteria.

The invention has several important technical advantages. For example, one advantage of the present invention is that it may provide the winning bidders with the ability to pay for items won using cash, money order, check or any other recognized form of payment. Alternatively, bidders may proceed to checkout by using the terminals to make immediate payments using, for example, wire transfer, credit card, or debit card. Accordingly, the present invention may eliminate or substantially reduce paperwork for the host and may minimize checkout errors in silent auctions, while allowing and driving attendees of charity and fundraising events to place and update their bids from the comfort of their own seats. Various embodiments of the invention may have none, some, or all of these advantages. Other technical advantages of the present invention will be readily apparent to one skilled in the art.

BRIEF DESCRIPTION OF THE DRAWINGS

For a more complete understanding of the present disclosure and its advantages, reference is now made to the following descriptions, taken in conjunction with the accompanying drawings, in which.

DETAILED DESCRIPTION OF THE DRAWINGS

Figure 1:
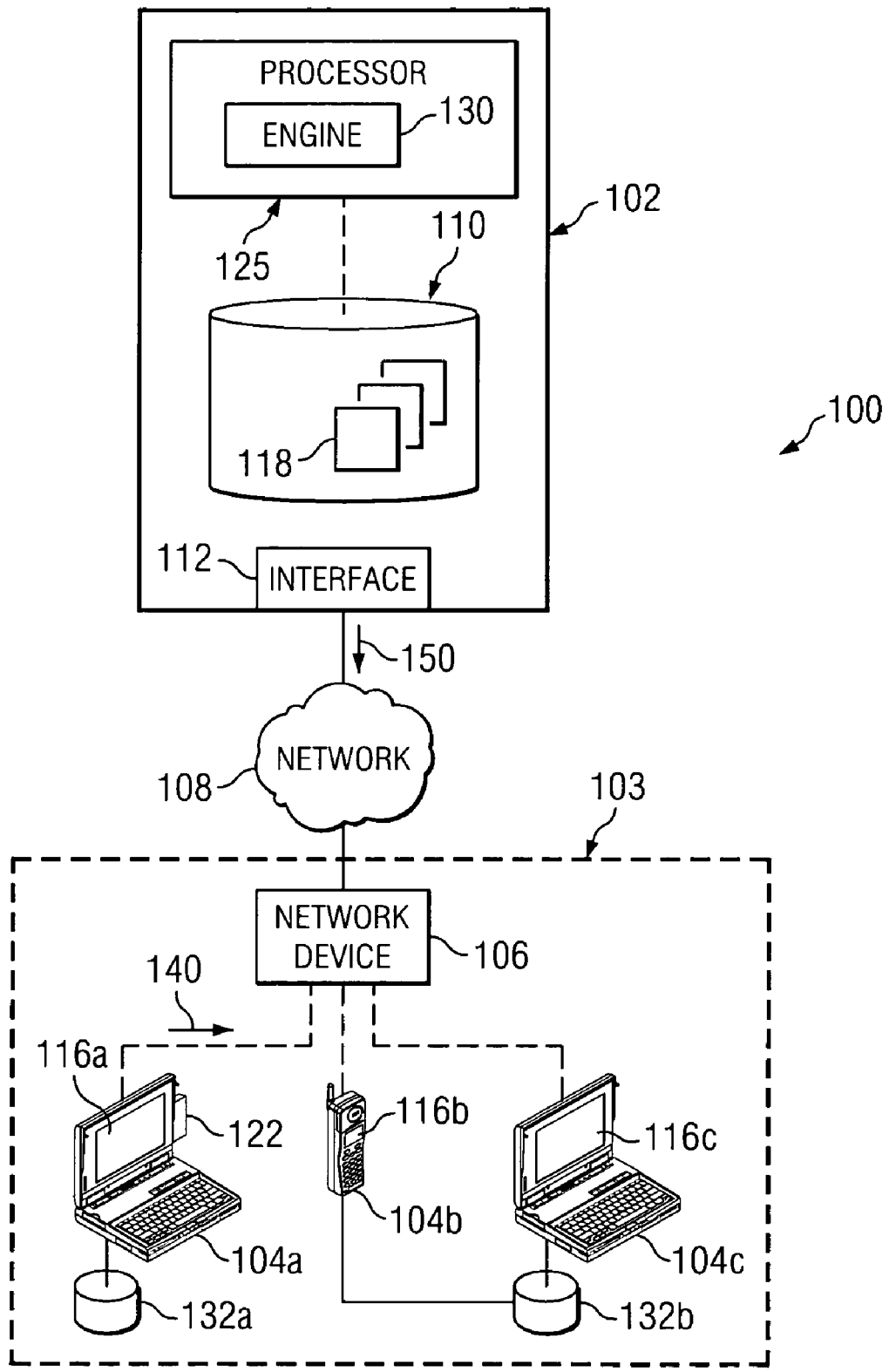
FIG. 1 illustrates an example silent auctioning system in accordance with one embodiment of the present disclosure.

FIG. 1 is a block diagram illustrating an auctioning system 100 for conducting electronic silent auctions. Generally, a silent auction is any charity, fundraising, or other auctioning event where third-party items are offered to attendees by a host of the event. Bidders at the silent auction are typically attendees of the particular auctioning event. System 100 provides bidders with an electronic bidsheet, located at the event, which is associated with the desired item and upon which the bidders submit the bids. Auctioning system 100 dynamically determines when the auction is over. Upon completion of the silent auction, system 100 gathers the bidsheets and determines the winners. System 100 then collects money from the winning bidder and assists in providing the item. Therefore, auctioning system 100 assists the host and the attendees of the silent auction, as well as the third-parties, by implementing many of the steps of the silent auction.

At a high level, auctioning system 100 is a distributed client/server system that allows attendees, typically present at a charity or fund-raising event, represented by location 103, to electronically partake in silent auctions that may be held at location 103. System 100 may also be a standard computing environment or any other suitable environment. For example, system 100 may include a central server 102 that is connected, through a local network device 106, such as a gateway, to one or more remote terminals or local clients 104 that are accessed and used by several attendees (or bidders) to form a distributed environment operable to dynamically host a silent auction for a plurality of items.

Each attendee may use one of these local clients 104 to enter a bid 140 on one or more items being auctioned by entering his name, selecting one or more items, and entering bid amount(s) on the selected items. Alternatively or in combination, the attendee may enter an identification number (or some other identifier) or simply swipe a smart card, credit card, or other identifying card, select the one or more items he may wish to bid on, and submit the appropriate number of bids anonymously. The term "dynamically," as used herein, generally means that certain processing is determined, at least in part, at run-time based on one or more variables. The term "automatically," as used herein, generally means that the appropriate processing is substantially performed by at least part of auctioning system 100. It should be understood that "automatically" further contemplates any suitable user or bidder interaction with system 100 without departing from the scope of this disclosure.

Server 102 comprises any local or remote computer operable to process auction data 118 using silent auction engine 130 and communicably connected to at least one client 104 via a network device 106. For example, server 102 may be a general-purpose personal computer (PC), a Macintosh, a workstation, a Unix-based computer, a server computer, or any other suitable device. FIG. 1 provides merely one example of computers that may be used with the disclosure. For example, although FIG. 1 illustrates one server 102 that may be used with the disclosure, system 100 can be implemented using computers other than servers, as well as a server pool. The present disclosure contemplates computers other than general purpose computers as well as computers without conventional operating systems. As used in this document, the term "computer" is intended to encompass a personal computer, workstation, network computer, or any other suitable processing device. Computer server 102 may be adapted to execute any operating system including UNIX, Windows, or any other suitable operating system so long as server 102 remains communicably connected to client 104. According to one embodiment, server 102 may be a remote web server. Therefore, server 102 may comprise any computer with software and/or hardware in any combination suitable to present clients 104 with at least a portion of auction data 118 stored in memory 110 and process bids 140 received from clients 104.

Memory 110 may include any memory or database module and may take the form of volatile or non-volatile memory including, without limitation, magnetic media, optical media, random access memory (RAM), read-only memory (ROM), removable media, or any other suitable local or remote memory component. In the illustrated embodiment, memory 110 includes at least auction data 118, but may also include any other appropriate data, such as user profiles. Memory 110 includes a variety of auction data 118 for one or more items and associated bidsheets.

Auction data 118 comprises logical descriptions (or data structures) of items and associated bidsheets. Auction data 118 may be stored in any physical or logical data storage operable to be defined, processed, or retrieved by externally implemented code. For example, auction data 118 may comprise one or more extensible Markup Language (XML) tables or documents. Item descriptions and bidsheets may be described in terms of SQL statements or scripts, Virtual Storage Access Method (VSAM) files, flat files, Btrieve files, or comma-separated-value (CSV) files. Auction data 118 may also comprise a plurality of tables or files stored on one server 102 or across a plurality of servers 102. Moreover, auction data 118 may be local or remote without departing from the scope of this disclosure.

Item and bidsheet data structures may comprise separate or collective tables, objects, or variables. Items being described in auction data 118 may be identified by an item identifier, a name, a number, a barcode, or any other suitable unique identifier. Items for silent auction often include physical objects, trips, rebates or coupons, discounts, vacation packages, or any other item appropriate for the silent auction. Each item, described by the respective data entity, is typically associated with one bidsheet.

The bidsheet provides an electronic data structure for storing, prioritizing, and otherwise processing the one or more bids for the associated item. Each entry in the bidsheet includes at least the bidder's name or other identifier, the item descriptor or other pointer thereto, and the bid amount. The entry may further include any other appropriate information such as time, IP address, and others. Typically, the current highest bid amount is the current winning bid and, at the end of the silent auction, is used to determine the winning bidder.

Server 102 also includes processor 125. Processor 125 executes instructions and manipulates data to perform the operations of server 102 such as, for example, a central processing unit (CPU). Although FIG. 1 illustrates a single processor 125 in server 102, multiple processors 125 may be used according to particular needs, and reference to processor 125 is meant to include multiple processors 125 where applicable. In certain embodiments, processor 125 executes one or more processes associated with silent auction engine 130 to present auction data 118 communicated from memory 110 to attendees via clients 104.

Silent auction engine 130 could include any hardware, software, firmware, or combination thereof operable to receive and process auction data 118 and present it to the attendee through GUI 116. When loading or configuring GUI 116, silent auction engine 130 may first process a configuration file, whether local or remote, to determine the initial layout and user preferences. It will be understood that while silent auction engine 130 is illustrated as a single multi-tasked module, the features and functionality performed by this engine may be performed by multiple modules such as, for example, a data retrieval module and a presentation engine. Moreover, silent auction engine 130 may comprise a child or sub-module of another software module without departing from the scope of this disclosure. Therefore, silent auction engine 130 comprises one or more software modules operable to provide item descriptions and process silent bids received from clients 104 through network 108.

Network 108 facilitates wireless or wireline communication between computer server 102 and any other computer, such as clients 104. Indeed, while illustrated as residing between server 102 and network device 106, network 108 may also reside between network device 106 and clients 104 without departing from the scope of the disclosure. In other words, network 108 encompasses any network, networks, or sub-network operable to facilitate communications between clients 104 and server 102. Network 108 may communicate, for example, Internet Protocol (IP) packets, Frame Relay frames, Asynchronous Transfer Mode (ATM) cells, voice, video, data, and other suitable information between network addresses. Network 108 may include one or more local area networks (LANs), radio access networks (RANs), metropolitan area networks (MANs), wide area networks (WANs), all or a portion of the global computer network known as the Internet, and/or any other communication system or systems at one or more locations.

Server 102 includes interface 112 for communicating with other computer systems, such as client 104, over network 108 in a client-server or other distributed environment. In certain embodiments, server 102 receives user data or bids 140 from network 108 for storage in memory 110. Generally, interface 112 comprises logic encoded in software and/or hardware in a suitable combination and operable to communicate with network 108. More specifically, interface 112 may comprise software supporting one or more communications protocols associated with communications network 108 or hardware operable to communicate physical signals.

Server 102 manages and communicates with at least one network device or gateway 106 via network 108, such as, for example, routers, bridges, hubs, switches, servers, gateway, IP telephones, access control devices, and any other suitable network devices that may be communicably coupled to server 102 and facilitates processing of bids 140 from location 103. Moreover, each network device 106 is communicably coupled to clients 104 via a local connection at the fundraising or charity event. This local connection may comprise any wireless or wireline link using any appropriate protocol.

Accordingly, network device 106 may handle tasks such as routing, protocol conversions, security, and other suitable functions and may also use any suitable encryption, handshakes, logins, and/or other appropriate hardware and/or software protocols. This disclosure contemplates that a local server 102 may include network device 106, while a remote server 102 may be linked to network device 106 via network 108. In short, network device 106 is any device for providing a link from a plurality of co-located clients 104 to server 102, whether on or offsite.

Each client 104 is any auctioning terminal or device operable to present the attendee with an auctioning interface via a graphical user interface (GUI) 116. At a high level, illustrated client 104 includes at least GUI 116 and comprises an electronic computing device operable to receive, transmit, process and store any appropriate data associated with system 100. It will be understood that there may be any number of clients 104 communicably coupled to server 102, as illustrated by client 104a and client 104b. Further, "client 104", "user of client 104", "attendee," and "bidder" may be used interchangeably as appropriate without departing from the scope of this disclosure. Moreover, for ease of illustration, each client is described in terms of being used by one bidder. But this disclosure contemplates that many bidders may use one computer to communicate bids on the same item.

Clients 104 are normally co-located at location 103. But it will be understood that "co-location" encompasses i) clients 104 physically located near other clients 104 in location 103; or ii) clients 104 physically remote but logically located with other clients 104 by being communicably coupled through a single network device 106 (or through a Virtual Private Network (VPN)), so long as the users of clients 104 may be considered attendees of the silent auction event. Of course, clients 104 may be transported, as in the case of a cell phone, to the event by the host or attendee at any point during the auctioning process.

As used in this disclosure, client 104 is intended to encompass a personal computer, touch screen terminal, workstation, network computer, kiosk, wireless data port, cell phone, personal data assistant (PDA), one or more processors within these or other devices, or any other suitable processing device. For example, client 104 may comprise a computer that includes an input device, such as a keypad, touch screen, mouse, or other device that can accept information, and an output device that conveys information associated with the operation of server 102 or clients 104, including digital data, visual information, or GUI 116. Both the input device and output device may include fixed or removable storage media such as a magnetic computer disk, CD-ROM, or other suitable media to both receive input from and provide output to users of clients 104 through the silent auctioning display, namely GUI 116.

GUI 116 comprises a graphical user interface operable to allow the user of client 104 to interface with system 100 to receive one or more sets of auction data. Generally, GUI 116 provides the user of client 104 with an efficient and user-friendly presentation of data provided by auction system 100. GUI 116 may comprise a plurality of customizable frames or views having interactive fields, pull-down lists, and buttons operated by the user. The terminals may include screens that may be updated to display the current highest bid per item to the attendees, and adapted to solicit bids from certain attendees or previous bidders. A typical screen may be associated with a keypad, or consist of a touch screen that an attendee may use to enter one or more bids on one or more items being auctioned. In one embodiment, GUI 116 presents a silent auction display that presents the various auction data items and receives commands from the user of client 104 via one of the input devices. Moreover, it should be understood that the term graphical user interface may be used in the singular or in the plural to describe one or more graphical user interfaces and each of the displays of a particular graphical user interface. Therefore, GUI 116 contemplates any graphical user interface, such as a generic web browser, that processes information in system 100 and efficiently presents the information to the attendee. Server 102 can accept data from client 104 via the web browser (e.g., Microsoft Internet Explorer or Netscape Navigator) and return the appropriate HTML or XML responses using network 108.

Each client 104 may further include or be coupled with other complementary devices such as, for example, card reader 122 and/or local memory for storing local auction data 132, thereby increasing user friendliness and efficiency while reducing auction downtime and delays. This disclosure contemplates one card reader 122 and/or memory for use by a plurality of clients 104, one individual card reader 122 and/or local memory per client 104, no card reader 122 or memory, or any combination thereof for the plurality of clients.

When used, local auction data 132 stores one or more subsets of central auction data 118, such as currently auctioned items and associated bidsheets. Local auction data 132 may receive a copy of auction data 118 through network device 106 or from another process running on client 104. As appropriate, local auction data 132 may be updated through any automatic, dynamic, or manual process operable to retrieve or receive auction data 118 from memory 110 at any appropriate time. For example, silent auction engine 130 may automatically communicate a copy of auction data 118 in memory 110 upon initial execution. Further, as with auction data 118, local auction data 132 may be of any suitable format including XML documents, VSAM files, flat files, CSV files, Btrieve files, relational database tables, and any other format operable to store at least one subset of auction data 118. In one embodiment, the subset may comprise one item description and bidsheet, thereby associating each client 104 with a unique item or bidsheet. It will be understood that local auction data 132 may be in a format different from memory 110 or communicated auction data 118 so long as it is compatible with GUI 116.

In one aspect of operation, silent auction engine 130 initiates an electronic silent auction for one or more items described in auction data 118. Once the silent auction begins, clients 104 at location 103 offer the item descriptions to attendees at the event. If desired, the attendee submits silent, electronic bids on the items. Silent auction engine 130 then provides and utilizes a series of protocols, algorithms, and rules that control the auction process and arranges, allocates, and updates the bids received from the co-located clients 104, as the various attendees enter their bids.

For example, engine 130 may alert a bidder that he has been outbid by communicating a text message, a telephone call, or any other messaging technique and may allow or prompt the attendee to enter a higher bid. Moreover, silent auction engine 130 may end the auction process at a pre-determined time, when bidding appears to have stopped in that no new bids have been received for a pre-determined amount of time, or based on any other predetermined criteria. Following the conclusion of the auction, the highest bidders on each of the auctioned items may be announced, automatically communicated through network device 106, or otherwise relayed to the attendees.

The winning bidders may pay for each item won via cash, money order, check or any other recognized form of payment. Alternatively, each bidder may proceed to checkout by using clients 104 to make payments on the spot via, for example, wire transfer, credit card or debit card using card reader 122. The present disclosure therefore contemplates substantially eliminating paperwork and reducing checkout errors in silent auctions, while allowing attendees of charity and other fundraising events to place and update their bids without manual intervention.

Figure 2:
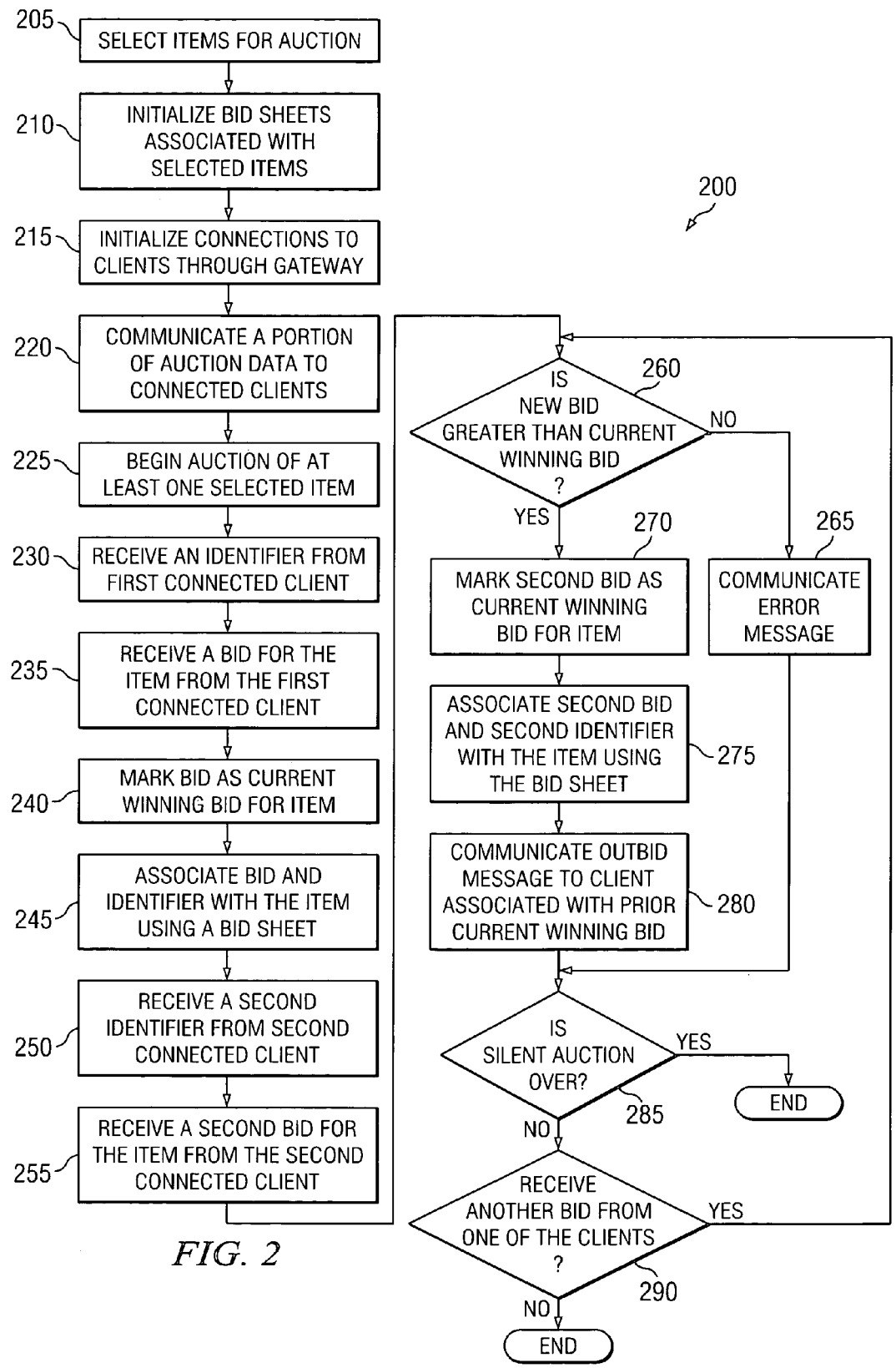
FIG. 2 illustrates an example method for providing an electronic silent auction in accordance with one embodiment of the present disclosure.

FIG. 2 is a flowchart illustrating an example method 200 for providing a silent auction at location 103 in accordance with one embodiment of the present disclosure. FIG. 2 illustrates method 200, which generally describes a silent auction of one of a plurality of items to a group of co-located clients 104. Of course, any number of items may be sequentially or concurrently auctioned within the scope of this disclosure. At a high level, method 200 includes initializing system 100 for the silent auction, performing the silent auction electronically, and receiving payment for the item once the auction is complete. The following description focuses on the operation of silent auction engine 130 in performing method 200. But system 100 contemplates using any appropriate combination and arrangement of logical elements implementing some or all of the described functionality.

Method 200 begins at step 205, where silent auction engine 130 selects items for auction at a charity or fundraising event at location 103. Silent auction engine 130 may automatically select these items, dynamically select these items based on predetermined criteria, or select items based on manual input as appropriate. Next, at step 210, silent auction engine 130 initializes electronic bidsheets associated with the selected items. As described above, typically these bidsheets are logical data structures stored in auction data 118. Initialization of the bidsheets may include zeroing the bidsheet or associating a minimum bid with the item. This minimum bid could be used by silent auction engine 130 to deny any bid 140 that does not meet the minimum amount.

Silent auction engine 130 then initializes connections to one or more clients 104 through network device 106 at step 215. As described above, network device 106 and clients 104 are typically co-located at an auction event occurring at location 103. In certain embodiments, silent auction engine 130 may communicate at least a portion of auction data 118 to connected clients 104 for storage of local auction data 132 at step 220, thereby improving the performance of system 100.

Silent auction engine 130 then begins an auction of one of the selected items at step 225. Silent auction engine 130 may concurrently begin an auction of a plurality of the selected items without departing from the scope of this disclosure. In other words, steps 225 through 290 may occur a plurality of times before the auction ends and may be processed in parallel. Further, the auction of the selected item may begin in any appropriate manner. For example, silent auction engine 130 may enable clients 104 to accept bids on the item from the attendee. In another example, silent auction engine 130 may instruct network device 106 to block any bid messages 140 from clients 104 until the auction begins. Once the auction begins, then silent auction engine 130 typically receives one or more bids 140 from clients 104 for processing, as described in steps 230 through 290.

According to the illustrated embodiment, attendees at the silent auction log onto one or more clients 104 in order to bid on the items. For example, at step 230 silent auction engine 130 receives at least an identifier from first connected client 104a, but may also receive a password, a bank account number, an address, or any other suitable information. Once the first attendee—now a bidder—is logged in, silent auction engine 130 receives a first bid 140 for this particular item from first connected client 104 at step 235. Next, at step 240, silent auction engine 130 marks this first bid 140 as the current winning bid for the item. Silent auction engine 130 then associates this winning bid and the associated identifier with this particular item using the electronic bidsheet stored in auction data 118 at step 245.

At any appropriate time, silent auction engine 130 receives a second user identifier from a second connected client 104 at step 250. As described above, second client 104 may merely comprise a second auction session on the same physical computer or device or a second physical computer or device. Further, second connected client 104 may connect to server 102 prior to first connected client 104, as appropriate. At step 255, silent auction engine 130 receives a second bid 140 for the item from the second connected client 104.

At decisional step 260, silent auction engine 130 determines if the new bid is greater than the current winning bid on the item. If the new bid is not greater than the current winning bid, then silent auction engine 130 communicates an alert to the appropriate client 104 at step 265 and processing proceeds to step 285. Otherwise, if the new bid 140 is greater than the current winning bid, then silent auction engine 130 marks the new bid 140 (in this case the second bid) as the current winning bid for the item at step 270. Silent auction engine 130 may also automatically communicate a successful bid message or congratulatory message to the currently winning bidder. Next, at step 275, silent auction engine 130 associates the second bid 140 and the appropriate identifier with the item using the bidsheet. If appropriate, silent auction engine 130 may then communicate an outbid message 150 to client 104 associated with the prior current winning bid at step 280.

At decisional step 285, silent auction engine 130 determines if the silent auction for the particular item is over. This determination may be accomplished according to any appropriate technique or algorithm. In one embodiment, the auction may end at a predetermined time such as three hours after the auction begins. In another embodiment, the auction may end when bidding appears to have stopped in that no new bids have been received during a range of time. For example, if a particular number of bids are not received by network device 106 during a certain amount of time (whether predetermined or dynamically determined), then bidding is ended. In another embodiment, the determination of the end of bidding may be according to a tiered system that processes the received number of bids based upon one of a number of time increments. For example, the bidding may be ended if network device 106 receives five or less bids during the first twenty minutes, four or less bids during the next twenty minutes, and three or less bids during any twenty minute range beyond that. Of course, silent auction engine 130 may use any combination of the above example techniques to determine the end of the bidding. For example, the bidding may be open for at least one hour and then the tiered technique may be utilized once the hour is passed. If the auction is not complete, then silent auction engine 130 may continue to receive bids from clients 104 at step 290 and, when appropriate, processing returns to step 260.

Once the silent auction for the item is over, then the item (or the use thereof) is then purchased by the bidder using any appropriate purchasing technique. For example, silent auction engine 130 may automatically process a payment based on the bidder's identifier and credit card number used at card reader 122. In another example, server 102 may communicate a winning message (not shown) to the appropriate client 104 with a prompt to enter payment. In yet another example, the bidder may manually swipe a credit card through card reader 122 communicably coupled to client 104 after receiving notification of winning the respective silent auction.

The preceding flowchart and accompanying description illustrate only exemplary method 200. System 100 contemplates using any suitable technique for performing these and other tasks. Accordingly, many of the steps in this flowchart may take place simultaneously and/or in different orders than as shown. Moreover, system 100 may use methods with additional steps, fewer steps, and/or different steps, so long as the methods remain appropriate.

Although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A method comprising:
    selecting, using a computing device, an item for auction, wherein the item is selected from a plurality of items stored on a server;
    transmitting to a remote device an indication that the selected item is available for auction for a period of time, wherein the remote device is connected to the computing device via a network;
    receiving, from each of a plurality of bidders, at least one bid to purchase the selected item, wherein each bid is received before the period of time has expired and each bidder is located remotely from the server;
    determining, using the computing device, that the period of time has expired based on determining that:
        (1) a first quantity of bids is received before a first time interval, wherein the first quantity of bids is less than a first pre-determined value; and
        (2) a second quantity of bids is received before a second time interval, wherein the second quantity of bids is less than a second pre-determined value; and
    determining a winning bid for the selected item based on predetermined criteria.

2. The method of claim 1 further comprising receiving each bid via a wireless connection.

3. The method of claim 1, wherein the receiving at least one bid to purchase the selected item further comprises: receiving, via a wireless device, at least one bid from each of the plurality of bidders.

4. The method of claim 1 further comprising:
    receiving each bid associated with the item via an auction site.

5. The method of claim 1 further comprising: associating each of the plurality of items with an electronic bidsheet that is stored in the server, and wherein the electronic bidsheet comprises at least one bid to purchase the item.

6. The method of claim 5, wherein each electronic bidsheet comprises a description of the associated item.

7. The method of claim 1, wherein the receiving at least one bid to purchase the selected item further comprises: receiving, via a local client, at least one bid from each of the plurality of bidders, wherein each client comprises a graphical user interface that is operable to receive an identifier of each bidder.

8. The method of claim 7, wherein the identifier of the bidder comprises a card number that coupled with a card reader is operable to process a card associated with the card number.

9. The method of claim 1 wherein the determining a winning bid for the selected item based on the predetermined criteria further comprises: determining that a value associated with the winning bid is greater than a plurality of other values associated with other bids submitted during the period of time.

10. The method of claim 1 further comprising:
    receiving a payment for the selected item from a bidder who submitted the winning bid; and
    delivering the selected item to the bidder who submitted the winning bid.

11. The method of claim 1 further comprising:
    receiving at least one other bid from at least one other customer after the period of time has expired; and
    notifying the other customer that the other bid has been rejected.

12. The method of claim 1, wherein the first quantity of bids is greater than the second quantity of bids.

13. An apparatus comprising:
    a processor; and
    a memory, wherein the memory stores instructions which, when executed by the processor, direct the processor to perform the acts of:
        selecting, using a computing device, an item for auction, wherein the item is selected from a plurality of items stored on a server;
        transmitting to a remote device an indication that the selected item is available for auction for a period of time, wherein the remote device is connected to the computing device via a network;
        receiving, from each of a plurality of bidders, at least one bid to purchase the selected item, wherein each bid is received before the period of time has expired and each bidder is located remotely from the server;
        determining, using the computing device, that the period of time has expired based on determining that:
            (1) a first quantity of bids is received before a first time interval, wherein the first quantity of bids is less than a first pre-determined value; and
            (2) a second quantity of bids is received before a second time interval, wherein the second quantity of bids is less than a second pre-determined value; and
        determining a winning bid for the selected item based on predetermined criteria.

14. The apparatus of claim 13, wherein the instructions further direct the processor to perform the act of: receiving each bid via a wireless connection.

15. The apparatus of claim 13, wherein the act of receiving at least one bid to purchase the selected item further comprises: receiving, via a wireless device, at least one bid from each of the plurality of bidders.

16. The apparatus of claim 13, wherein the instructions further direct the processor to perform the act of: receiving each bid associated with the item via an auction site.

17. The apparatus of claim 13, wherein the instructions further direct the processor to perform the act of: associating each of the plurality of items with an electronic bidsheet that is stored in the server, and wherein the electronic bidsheet comprises at least one bid to purchase the item.

18. The apparatus of claim 17, wherein each electronic bidsheet comprises a description of the associated item.

19. The apparatus of claim 13, wherein the act of receiving at least one bid to purchase the selected item further comprises: receiving, via a local client, at least one bid from each of the plurality of bidders wherein each client comprises a graphical user interface that is operable to receive an identifier of each bidder.

20. The apparatus of claim 19, wherein the identifier of the bidder comprises a card number that coupled with a card reader is operable to process a card associated with the card number.

21. The apparatus of claim 13, wherein the act of determining the winning bid for the selected item based on the predetermined criteria further comprises:
   determining that a value associated with the winning bid is greater than a plurality of other values associated with other bids submitted during the period of time.

22. The apparatus of claim 13, wherein the instructions further direct the processor to perform the acts of:
   receiving a payment for the selected item from a bidder who submitted the winning bid; and
   delivering the selected item to the bidder who submitted the winning bid.

23. The apparatus of claim 13, wherein the instructions further direct the processor to perform the acts of:
   receiving at least one other bid from at least one other customer after the period of time has expired; and
   notifying the other customer that the other bid has been rejected.

24. The apparatus of claim 13, wherein the first quantity of bids is greater than the second quantity of bids.

25. An article of manufacture comprising:
   a storage medium, wherein the storage medium stores instructions which, when executed by a processor, direct the processor to perform the acts of:
      selecting, an item for auction, wherein the item is selected from a plurality of items stored on a server;
      transmitting to a remote device an indication that the selected item is available for auction for a period of time, wherein the remote device is connected to the computing device via a network;
      receiving, from each of a plurality of bidders, at least one bid to purchase the selected item, wherein each bid is received before the period of time has expired and each bidder is located remotely from the server;
      determining, using the computing device, that the period of time has expired based on determining that:
         (1) a first quantity of bids is received before a first time interval, wherein the first quantity of bids is less than a first pre-determined value; and
         (2) a second quantity of bids is received before a second time interval, wherein the second quantity of bids is less than a second pre-determined value; and
      determining a winning bid for the selected item based on predetermined criteria.

26. The article of manufacture of claim 25, wherein the instructions further direct the processor to perform the act of: receiving each bid via a wireless connection.

27. The article of manufacture of claim 25, wherein the act of receiving at least one bid to purchase the selected item further comprises: receiving, via a wireless device, at least one bid from each of the plurality of bidders.

28. The article of manufacture of claim 25, wherein the instructions further direct the processor to perform the act of: receiving each bid associated with the item via an auction site.

29. The article of manufacture of claim 25, wherein the instructions further direct the processor to perform the act of: associating each of the plurality of items with an electronic bidsheet that is stored in the server, and wherein the electronic bidsheet comprises at least one bid to purchase the item.

30. The article of manufacture of claim 29, wherein each electronic bidsheet comprises a description of the associated item.

31. The article of manufacture of claim 25, wherein the act of receiving at least one bid to purchase the selected item further comprises: receiving, via a local client, at least one bid from each of the plurality of bidders, wherein each client comprises a graphical user interface that is operable to receive an identifier of each bidder.

32. The article of manufacture of claim 31, wherein the identifier of the bidder comprises a card number that coupled with a card reader is operable to process a card associated with the card number.

33. The article of manufacture of claim 25, wherein the act of determining the winning bid for the selected item based on the predetermined criteria further comprises: determining that a value associated with the winning bid is greater than a plurality of other values associated with other bids submitted during the period of time.

34. The article of manufacture of claim 25, wherein the instructions further direct the processor to perform the acts of:
   receiving a payment for the selected item from a bidder who submitted the winning bid; and
   delivering the selected item to the bidder who submitted the winning bid.

35. The article of manufacture of claim 25, wherein the instructions further direct the processor to perform the acts of:
   receiving at least one other bid from at least one other customer after the period of time has expired; and
   notifying the other customer that the other bid has been rejected.

36. The article of manufacture of claim 25, wherein the first quantity of bids is greater than the second quantity of bids.

* * * * *